United States Patent
Samara-Rubio et al.

(10) Patent No.: US 6,853,759 B2
(45) Date of Patent: Feb. 8, 2005

(54) METHOD AND APPARATUS FOR SENSING A TEMPERATURE ALONG AN OPTICAL PATH WITH A GRATING IN SEMICONDUCTOR MATERIAL

(75) Inventors: Dean A. Samara-Rubio, San Jose, CA (US); Andrew C. Alduino, San Jose, CA (US); Christina A. Frost, Ann Harbor, MI (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 10/365,122

(22) Filed: Feb. 12, 2003

(65) Prior Publication Data

US 2004/0156575 A1 Aug. 12, 2004

(51) Int. Cl.$^7$ ............................. G02B 6/00; G02B 6/04
(52) U.S. Cl. ........................... 385/12; 385/10; 385/31; 385/37
(58) Field of Search .................. 385/10–12, 37, 385/14, 31, 39; 128/63.3, 664, 665, 666; 356/39, 40, 41; 600/310, 322, 323, 473

(56) References Cited

U.S. PATENT DOCUMENTS

| | | | | | |
|---|---|---|---|---|---|
| 4,859,079 | A | * | 8/1989 | Wickersheim et al. | 374/131 |
| 5,277,496 | A | * | 1/1994 | Mayer et al. | 374/130 |
| 5,366,290 | A | * | 11/1994 | Mayer et al. | 374/130 |
| 5,766,956 | A | * | 6/1998 | Groger et al. | 436/164 |
| 5,879,294 | A | * | 3/1999 | Anderson et al. | 600/310 |
| 2004/0156575 | A1 | * | 8/2004 | Samara-Rubio et al. | 385/12 |

* cited by examiner

*Primary Examiner*—Akm Enayet Ullah
(74) *Attorney, Agent, or Firm*—Blakely, Sokoloff, Taylor & Zafman LLP

(57) ABSTRACT

A temperature sensing and control method and apparatus. In one aspect of the present invention, an apparatus according to the teachings of the present invention includes an optical path disposed in semiconductor material, a grating disposed in the optical path, and a thermal probe including an optical sensor optically coupled to the grating to sense a spectral response of the grating. The thermal probe is adapted to determine a temperature of the optical path in which the grating is disposed in response to the spectral response of the grating.

28 Claims, 5 Drawing Sheets

METHOD AND APPARATUS FOR SENSING A TEMPERATURE ALONG AN OPTICAL PATH WITH A GRATING IN SEMICONDUCTOR MATERIAL

BACKGROUND OF THE INVENTION

1. Field of the Invention

The present invention relates generally to optical devices and, more specifically, the present invention relates to Bragg grating optical devices.

2. Background Information

The need for fast and efficient optical-based technologies is increasing as Internet data traffic growth rate is overtaking voice traffic pushing the need for optical communications. Commonly used optical components include diffraction gratings, thin-film filters, fiber Bragg gratings, and arrayed-waveguide gratings.

A fiber Bragg grating is an optical fiber device that includes an optical fiber with periodic changes in the refractive index of fiber core materials along the fiber length, which may be formed by exposure of the photosensitive core to an intense optical interference pattern. With the changes in the refractive index along the fiber length, optical beams at a particular wavelength are reflected by the fiber Bragg grating while other wavelengths are allowed to propagate through the fiber.

A limitation with known fiber Bragg gratings is that the particular wavelength that is reflected by the fiber Bragg grating is substantially fixed. Consequently, if different wavelengths of light are to be reflected, different fiber Bragg gratings are utilized. In some known fiber Bragg gratings, nominal adjustments to the reflected wavelength may be provided by physically or mechanically stretching the optical fiber of the fiber Bragg grating to modify the length of the optical fiber. The disadvantage of this technique is that the amount of adjustment to the reflected wavelength is relatively small and the optical fiber may suffer damage from the physical stress and strain of the stretching.

BRIEF DESCRIPTION OF THE DRAWINGS

The present invention is illustrated by way of example and not limitation in the accompanying figures.

DETAILED DESCRIPTION

Methods and apparatuses for sensing the temperature of an optical path with gratings disposed in semiconductor material are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, the temperature of an optical path through a grating included in semiconductor material can be determined based on a spectral response of the grating. In one embodiment, the optical path includes one or more semiconductor-based tunable gratings, which provide a fully integrated solution on a single integrated circuit chip. In one embodiment, one or more wavelengths or channels of an infrared or near infrared input optical beam are reflected by a silicon-based optical grating in accordance with the teachings of the present invention. As will be discussed, the temperature of the optical path in which the gratings are disposed affects the spectral responses of the one or more gratings. The temperature of the optical path may then be determined based on the spectral response of at least one of the gratings in accordance with the teachings of the present invention. In one embodiment, Bragg wavelengths of the one or more tunable gratings may be controlled based on the temperature of the gratings using a heater and the thermal optic effect in for example silicon. Embodiments of the presently described semiconductor-based tunable gratings may be utilized in broadband optical networking systems or the like.

Figure 1:
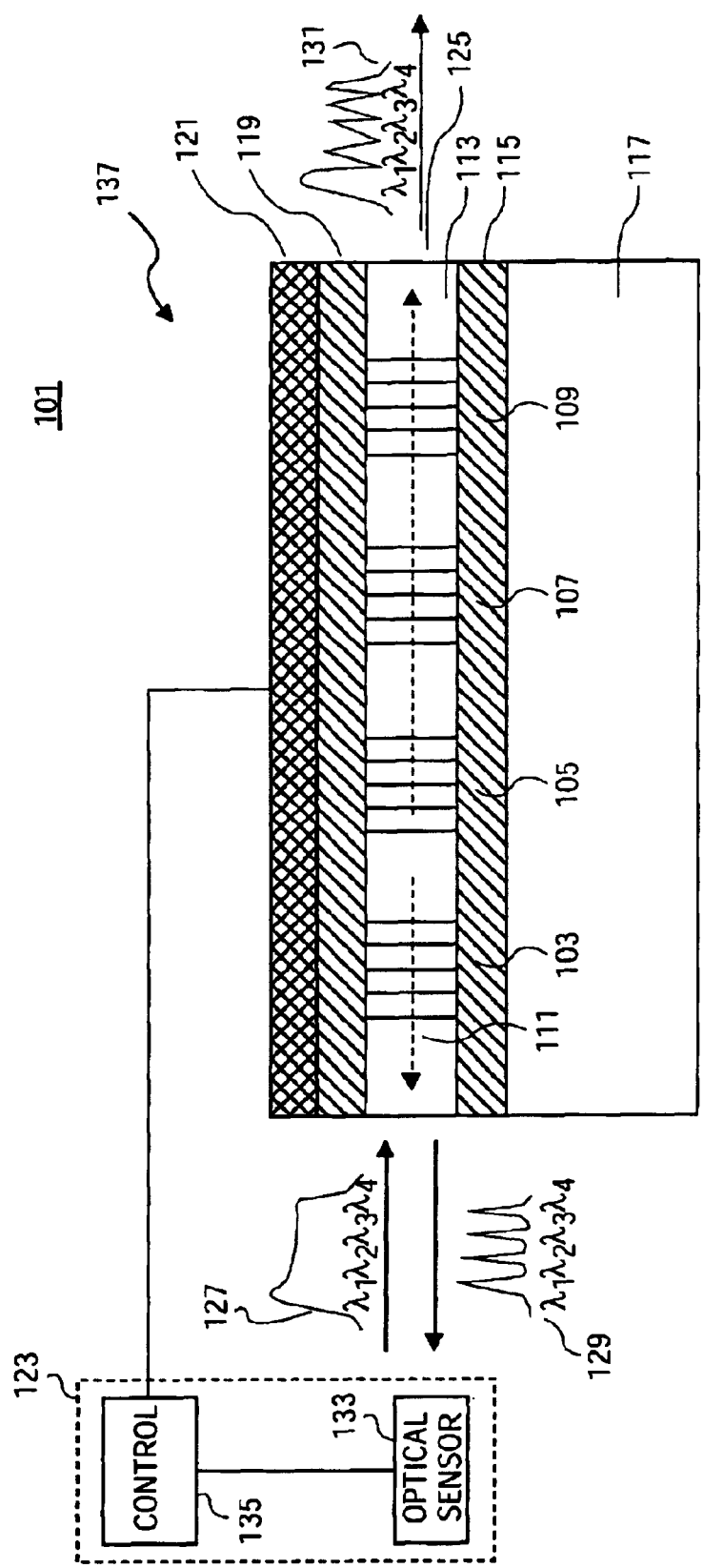
FIG. 1 is a block diagram illustrating a cross section of one embodiment of an optical path disposed in semiconductor material including a grating used to sense a temperature in a tunable Bragg grating in accordance with the teachings of the present invention.

To illustrate, FIG. 1 is a block diagram illustrating a cross section of one embodiment of an apparatus 101 including a plurality of semiconductor-based gratings 103, 105, 107 and 109 disposed in semiconductor material 113 in accordance with the teachings of the present invention. As shown in the depicted embodiment, a waveguide 125 is disposed in semiconductor material 113 such that an input optical beam 127 is directed along an optical path 111 along waveguide 125 through semiconductor material 113 as shown. In the illustrated embodiment for explanation purposes, optical beam 127 includes a plurality of channels or wavelengths $\lambda_1$, $\lambda_2$, $\lambda_3$ and $\lambda_4$. In one embodiment, wavelengths $\lambda_1$, $\lambda_2$, $\lambda_3$ and $\lambda_4$ are infrared or near infrared wavelengths. It is appreciated that optical beam 127 may include a greater number or few number of wavelengths in accordance with the teachings of the present invention. In one embodiment, waveguide 125 is a rib waveguide, a strip waveguide or another suitable type of optical waveguide.

In one embodiment, gratings 103, 105, 107 and 109 are tunable Bragg gratings and include periodic or quasi-periodic perturbations in an effective index of refraction $n_{eff}$ through waveguide 125 along optical path 111. For example, in one embodiment, gratings 103, 105, 107 and 109 are silicon/polysilicon gratings. In this embodiment, silicon and polysilicon having effective refractive indexes of $n_{Si}$ and $n_{poly}$, respectively, a small effective refractive index difference $\Delta n_{eff}$ (or $n_{poly}$-$n_{Si}$) is provided at each interface between silicon and polysilicon in along optical path 111 in waveguide 125. In one embodiment, $\Delta n_{eff}$ is approximately within the range of 0.005 to 0.01. It is appreciated that materials other than silicon and polysilicon and that other value ranges for $\Delta n_{eff}$ may be utilized in accordance with the teachings of the present invention and that the range of values for $\Delta n_{eff}$ of 0.005 to 0.01 is provided herewith for explanation purposes.

In the illustrated example, gratings 103, 105, 107 and 109 correspond to the plurality of channels or wavelengths $\lambda_1$, $\lambda_2$, $\lambda_3$ and $\lambda_4$ included in optical beam 127 for explanation purposes. Although four gratings are shown in FIG. 1 for explanation purposes, it is noted that there may be a greater or fewer number of gratings in other embodiments.

In addition, it is appreciated that silicon and polysilicon are example materials provided for explanation purposes and that other suitable semiconductor materials such as for example silicon germanium, silicon nitride, III–V semiconductor materials or the like may be utilized to form semiconductor-based gratings in accordance with the teachings of the present invention. In other embodiments, alternating regions having varying charge concentrations, doping concentrations or strain may also be employed to form the periodic or quasi-periodic perturbations in the effective index of refraction $n_{eff}$ provided by gratings 103, 105, 107 and 109 in accordance with the teachings of the present invention.

As illustrated in FIG. 1, semiconductor material 113 is included in one embodiment in a silicon-on-insulator (SOI) wafer 137. As such, an insulating layer 115 or a buried oxide layer is disposed between the layer of semiconductor material 113 and another layer of semiconductor material 117. In one embodiment, an additional insulating layer 119 is included such that the layer semiconductor material 113 is disposed between insulating layers 115 and 119. In one embodiment, insulating layer 119 includes an interlayer dielectric layer of the SOI wafer 137. In one embodiment, insulating layers 115 and 119 include an oxide material or the like. As a result, waveguide 125 including optical path 111 is provided in semiconductor material 113 with cladding provided by insulating layers 115 and 119.

As mentioned above, gratings 103, 105, 107 and 109 provide periodic or quasi-periodic perturbations in the effective index of refraction through waveguide 125 along optical path 111. As a result of the effective refractive index difference $\Delta n_{eff}$ described above, a multiple reflection of optical beam 127 occurs at gratings 103, 105, 107 and 109 along optical path 111. In one embodiment, a Bragg reflection occurs when a Bragg condition or phase matching condition is satisfied. In particular, for uniform Bragg gratings, when the condition $$m\lambda_B = 2n_{eff}\Lambda, \quad \text{(Equation 1)}$$

is satisfied, where m is the diffraction order, $\lambda_B$ is the Bragg wavelength, $n_{eff}$ is the effective index of the waveguide and $\Lambda$ is the period of the grating, a Bragg reflection occurs.

To illustrate, FIG. 1 shows Bragg conditions existing for $\lambda_B$ equal to $\lambda_1$, $\lambda_2$, $\lambda_3$ and $\lambda_4$ for gratings 103, 105, 107 and 109. Accordingly, a reflected optical beam 129 including reflection spectral peaks at wavelengths $\lambda_1$, $\lambda_2$, $\lambda_3$ and $\lambda_4$ is shown to be reflected back out of the waveguide 125 out from the end into which optical beam 127 is directed. Correspondingly, the remainder of optical beam 127 is illustrated in FIG. 1 as optical beam 131, which is transmitted through gratings 103, 105, 107 and 109 along waveguide 125 such that there are transmission spectral valleys at wavelengths $\lambda_1$, $\lambda_2$, $\lambda_3$ and $\lambda_4$.

In one embodiment, optical beam 127 may be an optical communications beam or the like on which data is encoded. In one embodiment, wave division multiplexing (WDM) or dense wave division multiplexing (DWDM) or the like may be employed with optical beam 127 such that a different channel is encoded with each of the wavelengths (e.g. $\lambda_1$, $\lambda_2$, $\lambda_3$, $\lambda_4$, etc.) included in optical beam 127. As will be discussed, one of the wavelengths (e.g. $\lambda_1$, $\lambda_2$, $\lambda_3$, $\lambda_4$, etc.) included in optical beam 127 may be an unused channel in optical beam 127 that can be employed to determine the temperature along optical path 111 through waveguide 125. In one embodiment, greater sensitivity may be achieved by aligning the reflection spectra of a grating used for temperature probing with the edges of the probe spectra.

In one embodiment, the Bragg wavelengths that are reflected by tunable gratings 103, 105, 107 and 109 are tunable or adjustable with a heater 121 thermally coupled to waveguide 125. In an embodiment, heater 121 includes a thin-film heater or the like or other future arising technology that controls the temperature of semiconductor material 113 in waveguide 125 along optical path 111. For instance, silicon and polysilicon have large index of refraction variations with temperature on the order of approximately $2 \times 10^{-4}/°$ K. It is appreciated that the thermo-optic effect in silicon or the index of refraction variations with temperature for semiconductor materials such as silicon and/or polysilicon are two orders of magnitude greater than other materials such as for example silica or the like. Thus, by controlling the temperature of the semiconductor material 113 of waveguide 125 along optical path 111, relatively significant shifts in the center wavelength of light reflected by a tunable Bragg grating 101 are provided in accordance with the teachings of the present invention. For example, in one embodiment, a Bragg wavelength shift on the order of approximately 0.1 nm/° K. is realized in accordance with the teachings of the present invention.

Figure 2A:
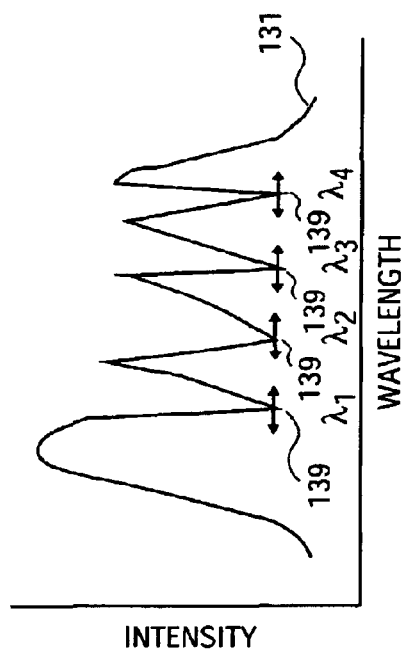
FIG. 2A is a diagram illustrating input spectra of an optical beam having a plurality of wavelengths or channels directed through an optical path disposed in semiconductor material in accordance with the teachings of the present invention.

To illustrate, FIG. 2A is a diagram illustrating the input spectra of optical beam 127, which is directed through optical path 111 disposed in semiconductor material 113 in accordance with the teachings of the present invention. As shown, optical beam 127 includes a plurality of channels including wavelengths $\lambda_1$, $\lambda_2$, $\lambda_3$ and $\lambda_4$.

Figure 2B:
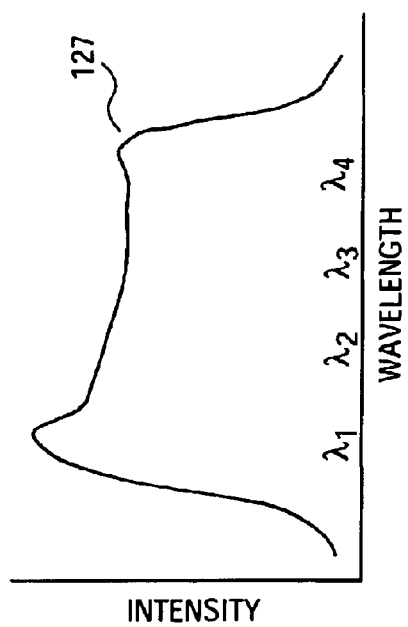
FIG. 2B is a diagram illustrating reflection spectral peaks of an optical beam having a plurality of wavelengths or channels reflected from a plurality of gratings disposed in an optical path disposed in semiconductor material in accordance with the teachings of the present invention.

FIG. 2B is a diagram illustrating reflection spectral peaks 137 of reflected optical beam 129. In the illustrated example, the reflection spectral peaks 137 occur at wavelengths $\lambda_1$, $\lambda_2$, $\lambda_3$ and $\lambda_4$, which correspond to gratings 103, 105, 107 and 109 disposed in optical path 111. The temperature of gratings 103, 105, 107 and 109 along optical path 111 in waveguide 125 can be determined in response to the specific wavelengths at which reflection spectral peaks 137 occur in accordance with the teachings of the present invention. As shown in FIG. 2B, the wavelengths at which reflection spectral peaks 137 occur shift in response to temperature changes in gratings 103, 105, 107 and 109 along optical path 111 in waveguide 125. As will be discussed, the sensing of the reflection spectral peaks 137 may be employed in one embodiment to sense the spectral response of one or more of gratings 103, 105, 107 and 109. In so doing, the temperature of optical path 111 in waveguide 125 in semiconductor material 113 may be determined in accordance with the teachings of the present invention.

Figure 2C:
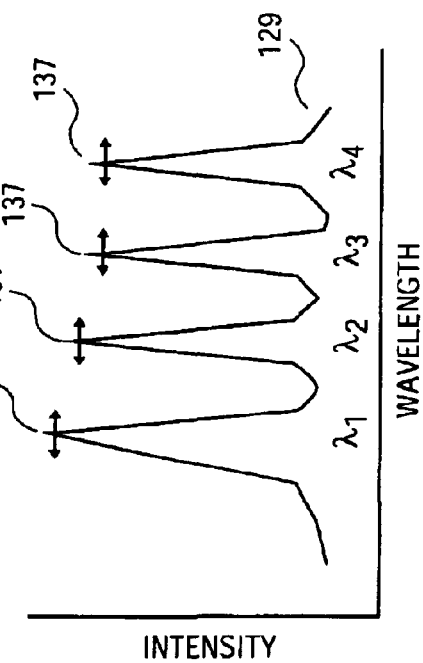
FIG. 2C is a diagram illustrating transmission spectral valleys of an optical beam having a plurality of wavelengths or channels directed through a plurality of gratings disposed in an optical path disposed in semiconductor material in accordance with the teachings of the present invention.

FIG. 2C is a diagram illustrating transmission spectral valleys 139 of optical beam 131. In the illustrated example, the transmission spectral valleys 139 occur at wavelengths $\lambda_1$, $\lambda_2$, $\lambda_3$ and $\lambda_4$, which correspond to gratings 103, 105, 107 and 109 disposed in optical path 111. The temperature of gratings 103, 105, 107 and 109 along optical path 111 in waveguide 125 can be determined in response to the specific wavelengths at which transmission spectral valleys 139 occur in accordance with the teachings of the present invention. As shown in FIG. 2C, the wavelengths at which transmission spectral valleys 139 occur shift in response to temperature changes in gratings 103, 105, 107 and 109 along optical path 111 in waveguide 125. As will be discussed, the sensing of the transmission spectral peaks 137 may be employed in another embodiment to sense the spectral response of one or more of gratings 103, 105, 107 and 109. In so doing, the temperature of optical path 111 in waveguide 125 in semiconductor material 113 may be determined in accordance with the teachings of the present invention.

To illustrate, attention is directed back to FIG. 1. As shown in the illustrated embodiment, a thermal probe 123 including an optical sensor 133 is optically coupled to detect the spectral responses of gratings 103, 105, 107 and 109. In one embodiment, optical sensor 133 may be a large area photo-diode or other suitable optical sensor and may be placed with very coarse and inexpensive alignment to measure low power levels. In the depicted embodiment, optical sensor 133 is optically coupled to detect reflection spectral peaks 137 and shifts in reflection spectral peaks 137 from optical beam 129, which is reflected from gratings 103, 105, 107 and 109. By detecting reflection spectral peaks 137 and the shifts of reflection spectral peaks 137, the temperature and shifts in temperature along optical path 111 through waveguide 125 in semiconductor material 113 can be determined in accordance with the teachings of the present invention.

In the illustrated embodiment, thermal probe 123 further includes control 135 coupled to optical sensor 133 to sense the temperature and temperature shifts along optical path 111. In one embodiment, control 135 of thermal probe 123 is further coupled to heater 121 to control the temperature of waveguide 125 along optical path 111 as discussed above.

Figure 3:
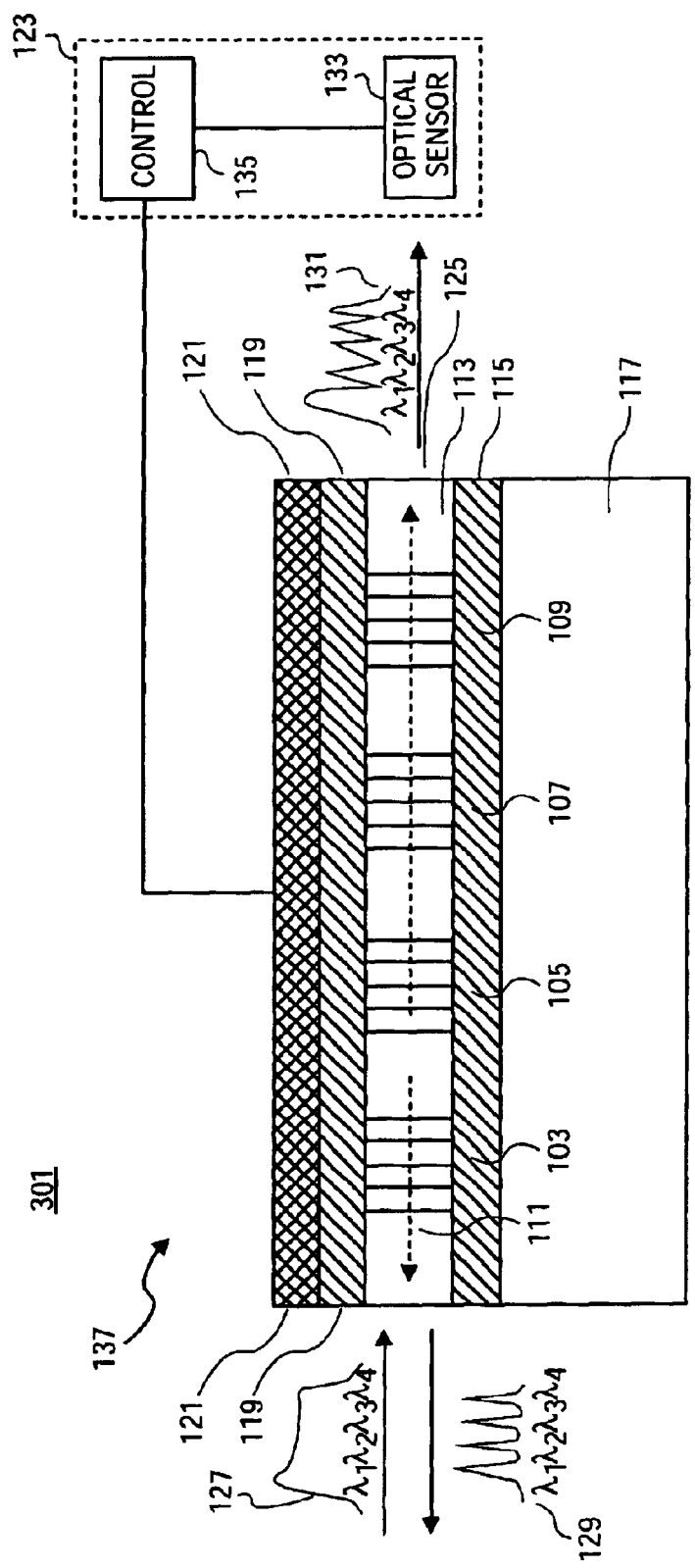
FIG. 3 is a block diagram illustrating a cross section of another embodiment of an optical path disposed in semiconductor material including a grating used to sense a temperature in a tunable Bragg grating in accordance with the teachings of the present invention.

To illustrate, FIG. 3 is a block diagram illustrating a cross section of another embodiment of an apparatus 301 in accordance with the teachings of the present invention. As can be appreciated, apparatus 301 shares many similarities with apparatus 101 of FIG. 1. In particular, the embodiment of apparatus 301 illustrated in FIG. 3 includes an SOI wafer 137 having layers of insulating material 115 and 121 a layers semiconductor material 113 and 117. The layer of semiconductor material 113 includes a waveguide 125. A plurality of gratings 103, 105, 107 and 109 are disposed along an optical path 111 through waveguide 125. An optical beam 127 including a plurality of channels or wavelengths $\lambda_1$, $\lambda_2$, $\lambda_3$ and $\lambda_4$ is directed through waveguide 125 along optical path 111 such that optical beam 129 is reflected from gratings 103, 105, 107 and 109 and that optical beam 131 is transmitted through gratings 103, 105, 107 and 109. FIG. 3 also shows that reflected optical beam 129 includes reflection spectral peaks at wavelengths $\lambda_1$, $\lambda_2$, $\lambda_3$ and $\lambda_4$ and that transmitted optical beam 131 includes transmission spectral valleys at wavelengths $\lambda_1$, $\lambda_2$, $\lambda_3$ and $\lambda_4$ from which the spectral responses of gratings 103, 105, 107 and 109 can be determined.

As shown in the illustrated embodiment, a thermal probe 123 including an optical sensor 133 is optically coupled to detect the spectral responses of gratings 103, 105, 107 and 109. In one embodiment, a difference between apparatus 301 of FIG. 3 and apparatus 101 of Figure is that optical sensor 133 is optically coupled to detect the transmission spectral valleys 139 and shifts in transmission spectral valleys 139 from optical beam 131, which are transmitted through gratings 103, 105, 107 and 109. By detecting transmission spectral valleys 139 and the shifts of transmission spectral valleys 137, the temperature and shifts in temperature along optical path 111 through waveguide 125 in semiconductor material 103 can be determined in accordance with the teachings of the present invention.

As illustrated in the embodiment of FIG. 1, apparatus 301 of the illustrated embodiment of FIG. 3 further includes control 135 coupled to optical sensor 133 to sense the temperature and temperature shifts along optical path 111. In one embodiment, control 135 of thermal probe 123 is further coupled to heater 121 to control the temperature of waveguide 125 along optical path 111 as discussed above.

Figure 4:
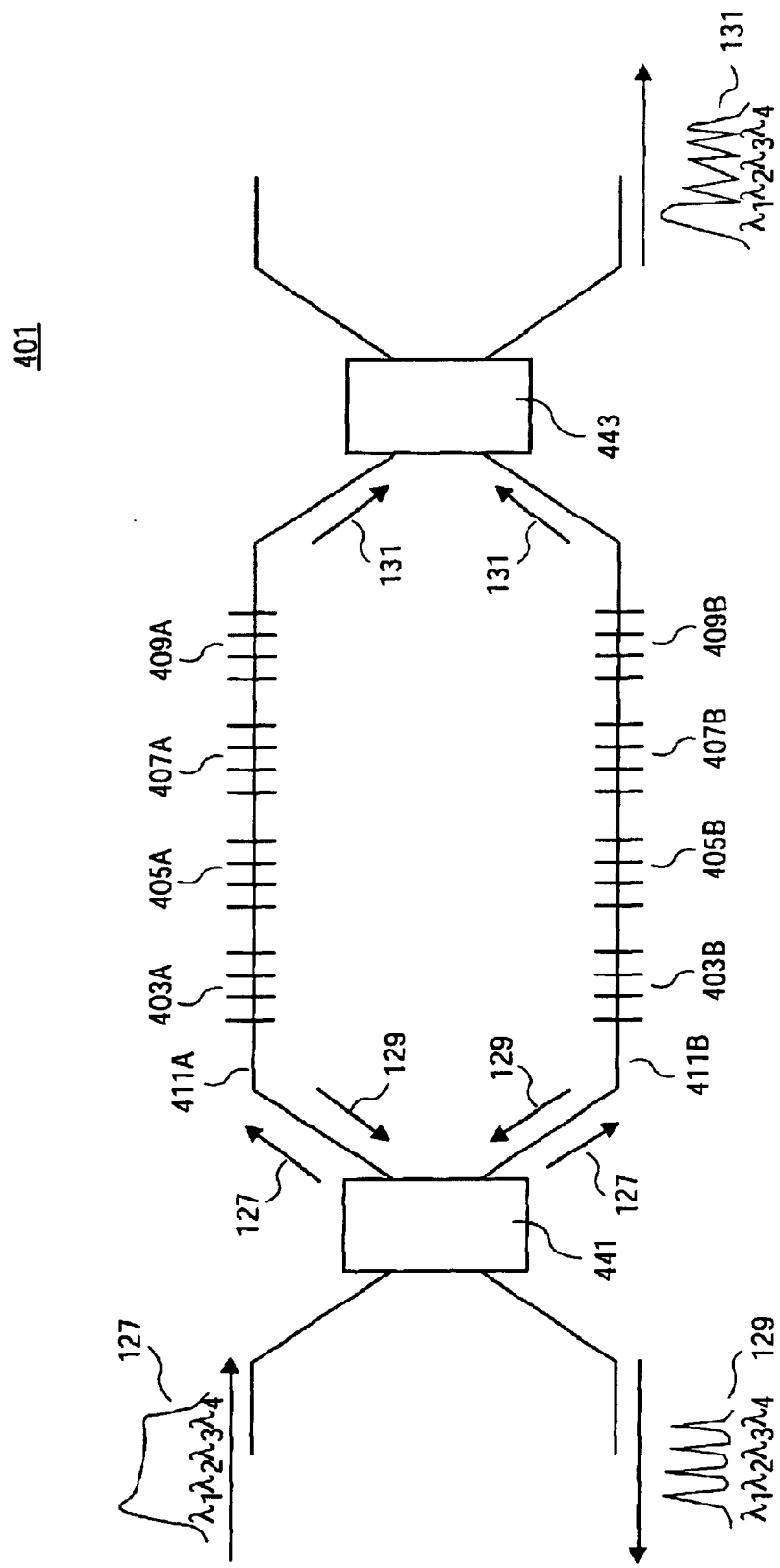
FIG. 4 is a block diagram illustrating one embodiment of an apparatus in which reflection spectral peaks or transmission spectral valleys may be probed to sense a temperature in a tunable Bragg grating in accordance with the teachings of the present invention.

FIG. 4 is a block diagram illustrating one embodiment of an apparatus 401 in which reflection spectral peaks 137 or transmission spectral valleys 139 may be probed to sense a temperature in an optical path in accordance with the teachings of the present invention. As can be appreciated, apparatus 401 in one embodiment is an optical add/drop multiplexer including a 3dB optical coupler 441 and a 3dB optical coupler 443. As illustrated in the embodiment of FIG. 4, an optical path 411A including gratings 403A, 405A, 407A and 409A and an optical path 411B including gratings 403B, 405B, 407B and 409B are optically coupled between 3dB optical couplers 441 and 443. It is appreciated that optical paths 411A and 411B and their respective gratings are similar in function and operation to optical path 111 as described above with respect to FIGS. 1–3.

In operation optical beam 127, which includes for example wavelengths $\lambda_1$, $\lambda_2$, $\lambda_3$ and $\lambda_4$ is directed into 3dB optical coupler 441. In one embodiment, one of the wavelengths $\lambda_1$, $\lambda_2$, $\lambda_3$ and $\lambda_4$ may be employed for the purpose of sensing temperature while the other wavelengths may be channels in which data or other information is encoded.

As shown in the depicted embodiment, optical beam 127 is split by 3dB optical coupler 441 such that optical beam 127 is directed through both optical paths 411A and 411B. In one embodiment, 3dB optical coupler 441 splits the optical power of optical beam 127 substantially equally with low optical loss over a relatively broad spectral range. The relative phase difference between optical beams 127 directed through optical paths 411A and 411B is substantially equal to $\pi/2$.

As shown in the depicted embodiment, gratings 403A, 405A, 407A, 409A, 403B, 405B, 407B and 409B have spectral responses such that reflected optical beams 129 including reflection spectral peaks at wavelengths $\lambda_1$, $\lambda_2$, $\lambda_3$ and $\lambda_4$ is shown to be reflected by gratings 403A, 405A, 407A, 409A, 403B, 405B, 407B and 409B.

Correspondingly, the transmitted optical beams 131 are transmitted through gratings 403A, 405A, 407A, 409A, 403B, 405B, 407B and 409B such that there are transmission spectral valleys at wavelengths $\lambda_1$, $\lambda_2$, $\lambda_3$ and $\lambda_4$.

In one embodiment, the reflected optical beams 129 including the reflection spectral peaks at wavelengths $\lambda_1$, $\lambda_2$, $\lambda_3$ and $\lambda_4$ are reflected back to 3dB optical coupler 441 through optical paths 411A and 411B such that reflected optical beam 129 is output from 3dB optical coupler 441, as shown in the lower left hand corner of FIG. 4. Similarly, the transmitted optical beams 131 including the transmission spectral valleys at wavelengths $\lambda_1$, $\lambda_2$, $\lambda_3$ and $\lambda_4$ are directed to 3dB optical coupler 443 through optical paths 411A and 411B such that transmitted optical beam 131 is output from 3dB optical coupler 443, as shown in the lower right hand corner of FIG. 4.

In one embodiment, an optical sensor such may be optically coupled to receive reflected optical beam 129 or transmitted optical beam 131 from apparatus 401 to sense the spectral response of one or more of the gratings 403A, 405A, 407A, 409A, 403B, 405B, 407B and 409B to determine and control temperature along optical paths 411A and 411B in accordance with the teachings of the present invention.

Figure 5:
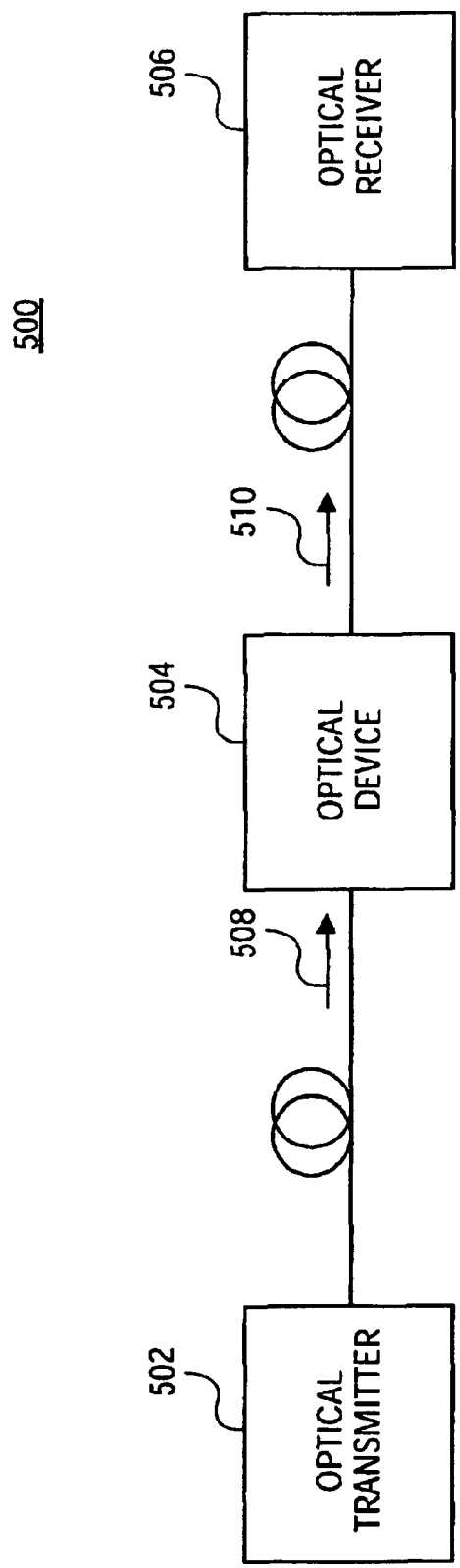
FIG. 5 is a block diagram illustration of one embodiment of a system including an optical transmitter and an optical receiver with an optical device in which temperature may be sensed according to embodiments of the present invention.

FIG. 5 is a block diagram illustration of one embodiment of a system including an optical transmitter and an optical receiver with an optical device in which temperature may be sensed and controlled according to embodiments of the present invention. For instance, optical communication system 500 illustrated in FIG. 5 includes an optical device 504 in accordance with the teachings of the present invention. In various embodiments, optical device 504 may include a tunable Bragg grating with temperature sensing and control, such as for example one similar to any of the embodiments described above with respect to FIGS. 1–4 in accordance with the teachings of the present invention. In the depicted embodiment, optical communication system 500 includes an optical transmitter 502 to transmit an optical beam 508. An optical receiver 506 is optically coupled to receive optical beam 508. It is appreciated that optical transmitter 502 and optical receiver 506 may also include optical transceivers and therefore have both transmitting and receiving capabilities for bi-directional communications.

In one embodiment, optical device 504 is optically coupled between optical transmitter 502 and optical receiver 506. In the illustrated embodiment, optical device 504 is shown to be at the receiving end of optical communication system 500. In other embodiments, optical device 504 may be disposed at various locations along a transmission path or at the transmitting end of optical communication system 500. In one embodiment, the tunable Bragg grating included in optical device 504 may be utilized in for example optical add/drop multiplexers enabling the addition or extraction of one or more channels from a wave division multiplexed (WDM) optical beam 508 transmitted from optical transmitter 502 along an optical path. Thus, an optical beam 510 having a specific wavelength is output from optical device 504.

It is appreciated of course that optical communication system 500 is an illustration of one example of an optical device 504 that includes a temperature sensing and control device in accordance with the teachings of the present invention. In other embodiments, optical communication system 500 may include other types of optical devices that include temperature sensing and control in an optical waveguide in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   an optical path disposed in a material;
   a grating disposed in the optical path; and
   a thermal probe including an optical sensor optically coupled to the grating to sense a spectral response of the grating, the thermal probe to determine a temperature of the optical path in which the grating is disposed in response to the spectral response of the grating.

2. The apparatus of claim 1 wherein the grating is a Bragg grating having a Bragg wavelength, wherein the spectral response is responsive to the Bragg wavelength.

3. The apparatus of claim 1 wherein the spectral response includes a reflection spectral peak, the optical sensor optically coupled to receive an optical beam having the reflection spectral peak reflected from the grating.

4. The apparatus of claim 1 wherein the spectral response includes a transmission spectral valley, the optical sensor optically coupled to receive an optical beam having the transmission spectral valley transmitted from the grating.

5. The apparatus of claim 1 wherein the grating is one of a plurality of gratings disposed in the optical path, wherein each of the plurality of gratings has a corresponding spectral response.

6. The apparatus of claim 5 wherein the optical beam includes a plurality of wavelengths corresponding to the plurality of gratings disposed in the optical path, wherein one of the plurality of wavelengths includes a probe wavelength to determine the temperature of the optical path.

7. The apparatus of claim 5 further comprising a heater coupled to the thermal probe and thermally coupled to the material to control the temperature of the optical path in which the plurality of gratings are disposed.

8. The apparatus of claim 7 wherein the corresponding spectral response of each of the plurality of gratings is responsive to the temperature of the optical path.

9. The apparatus of claim 1 further comprising an optical waveguide disposed in the material, wherein the optical path is included within the optical waveguide through the material.

10. The apparatus of claim 1 wherein the material comprises silicon.

11. A method, comprising:
    directing an optical beam through an optical path disposed in a material from a grating disposed in the optical path;
    sensing a spectral response of the grating in response to the optical beam directed from the grating; and
    determining a temperature of the optical path in which the grating is disposed in response to the spectral response of the grating.

12. The method of claim 11 wherein directing the optical beam through the optical path from the grating comprises directing the optical beam through the grating, wherein the spectral response includes a transmission spectral valley such that the optical beam directed from the grating has the transmission spectral valley.

13. The method of claim 11 wherein directing the optical beam through the optical path from the grating comprises reflecting at least a portion of the optical beam from the grating, wherein the spectral response includes a reflection spectral peak such that the optical beam directed from the grating has the reflection spectral peak.

14. The method of claim 11 wherein the spectral response of the grating is responsive to a Bragg wavelength of the grating.

15. The method of claim 14 further comprising tuning the Bragg wavelength of the grating in response to the temperature of the optical path in which the grating is disposed.

16. The method of claim 15 wherein tuning the Bragg wavelength of the grating comprises adjusting the temperature of the optical path in which the grating is disposed.

17. The method of claim 16 wherein adjusting the temperature of the optical path in which the grating is disposed comprises adjusting an amount of heat generated with a heater thermally coupled to the optical path.

18. The method of claim 11 wherein the optical beam includes a plurality of channels, each of which having a corresponding wavelength, the method further comprising reflecting at least a portion of one or more of the channels of the optical beam with a corresponding plurality of gratings disposed in the optical path, each of the plurality of gratings having corresponding Bragg wavelengths.

19. A system, comprising:
   an optical transmitter to transmit an optical beam;
   an optical device optically coupled to the optical transmitter to receive the optical beam, the optical device including
   an optical path disposed in a material;
   a grating disposed in the optical path; and
   a thermal probe including an optical sensor optically coupled to the grating to sense a spectral response of the grating, the thermal probe to determine a temperature of the optical path in which the grating is disposed in response to the spectral response of the grating; and
   an optical receiver optically coupled to the optical device to receive at least a portion of the optical beam.

20. The system of claim 19 wherein the grating is a Bragg grating having a Bragg wavelength, wherein the spectral response is responsive to the Bragg wavelength.

21. The system of claim 19 wherein the spectral response includes a reflection spectral peak, the optical sensor optically coupled to receive an optical beam having the reflection spectral peak reflected from the grating.

22. The system of claim 19 wherein the spectral response includes a transmission spectral valley, the optical sensor optically coupled to receive an optical beam having the transmission spectral valley transmitted from the grating.

23. The system of claim 19 wherein the grating is one of a plurality of gratings disposed in the optical path, wherein each of the plurality of gratings has a corresponding spectral response.

24. The system of claim 23 wherein the optical beam includes a plurality of wavelengths corresponding to the plurality of gratings disposed in the optical path, wherein one of the plurality of wavelengths includes a probe wavelength to determine the temperature of the optical path.

25. The system of claim 23 further comprising a heater coupled to the thermal probe and thermally coupled to the material to control the temperature of the optical path in which the plurality of gratings are disposed.

26. The system of claim 25 wherein the corresponding spectral response of each of the plurality of gratings is responsive to the temperature of the optical path.

27. The system of claim 19 further comprising an optical waveguide disposed in the material, wherein the optical path is included within the optical waveguide through the material.

28. The system of claim 19 wherein the material comprises silicon.

* * * * *